United States Patent
Gray

(10) Patent No.: US 10,392,924 B2
(45) Date of Patent: Aug. 27, 2019

(54) SYSTEM AND METHOD FOR NON-INVASIVE CAPACITIVE PRESSURE MEASUREMENT

(71) Applicant: Cameron International Corporation, Houston, TX (US)

(72) Inventor: Conor Gray, Longford (IE)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 112 days.

(21) Appl. No.: 15/245,122

(22) Filed: Aug. 23, 2016

(65) Prior Publication Data

US 2017/0058661 A1    Mar. 2, 2017

Related U.S. Application Data

(60) Provisional application No. 62/209,259, filed on Aug. 24, 2015.

(51) Int. Cl.
*G01L 9/12* (2006.01)
*E21B 47/00* (2012.01)
*E21B 47/06* (2012.01)

(52) U.S. Cl.
CPC .......... *E21B 47/06* (2013.01); *E21B 47/0001* (2013.01); *G01L 9/12* (2013.01)

(58) Field of Classification Search
CPC .......... G01L 9/12; E21B 47/06; E21B 47/0001
See application file for complete search history.

(56) References Cited

U.S. PATENT DOCUMENTS

| | | | |
|---|---|---|---|
| 4,125,027 A | 11/1978 | Clark | |
| 4,772,983 A | 9/1988 | Kerber et al. | |
| 5,053,915 A | 10/1991 | Dupraz | |
| 5,808,205 A | 9/1998 | Romo | |
| 9,976,922 B2 * | 5/2018 | Plochinger | G01L 9/0072 |
| 2008/0218374 A1 * | 9/2008 | Hagen | E21B 47/12 340/854.3 |
| 2014/0345942 A1 * | 11/2014 | Davis | E21B 41/0092 175/38 |
| 2015/0204183 A1 * | 7/2015 | Fuhst | E21B 47/06 166/250.01 |
| 2015/0283342 A1 * | 10/2015 | Mielcarz | G09B 23/288 128/202.22 |

FOREIGN PATENT DOCUMENTS

GB    1513285 A    6/1978

OTHER PUBLICATIONS

PCT International Search Report & Written Opinion; Application No. PCT/US2016/048493; dated Nov. 7, 2016; 13 Pages.

* cited by examiner

*Primary Examiner* — Justin Seo
*Assistant Examiner* — John M Royston
(74) *Attorney, Agent, or Firm* — Fletcher Yoder, P.C.

(57) ABSTRACT

A system including a hydrocarbon extraction system configured to receive a pressurized fluid, the hydrocarbon extraction system, including a non-invasive capacitive pressure measurement system configured to measure a pressure of the pressurized fluid, the non-invasive capacitive pressure measurement system, including a housing, a core configured to rest within the housing, and an insulative material between the core and housing wherein the insulative material is configured to provide a gap between the core and the housing to form a capacitor.

20 Claims, 15 Drawing Sheets

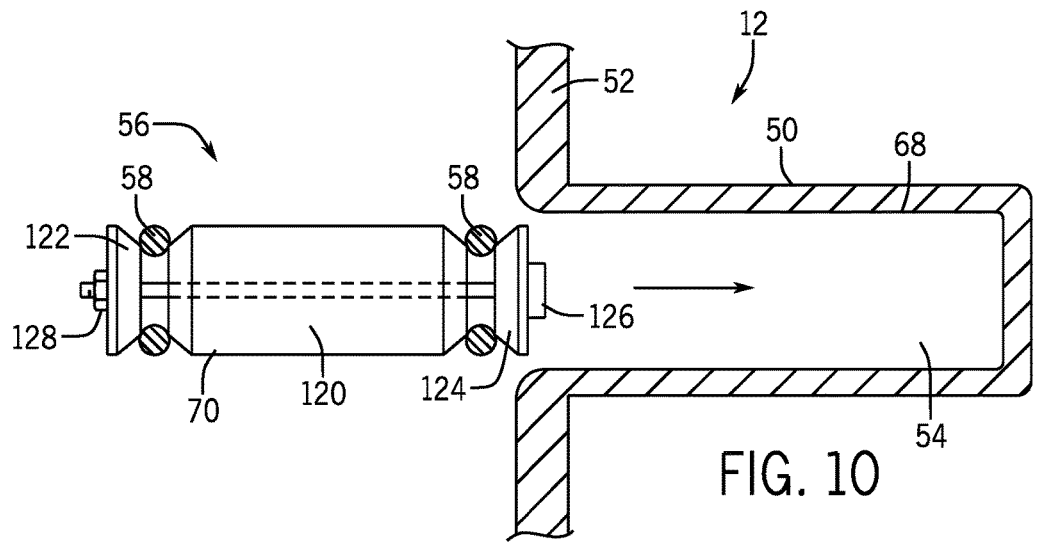
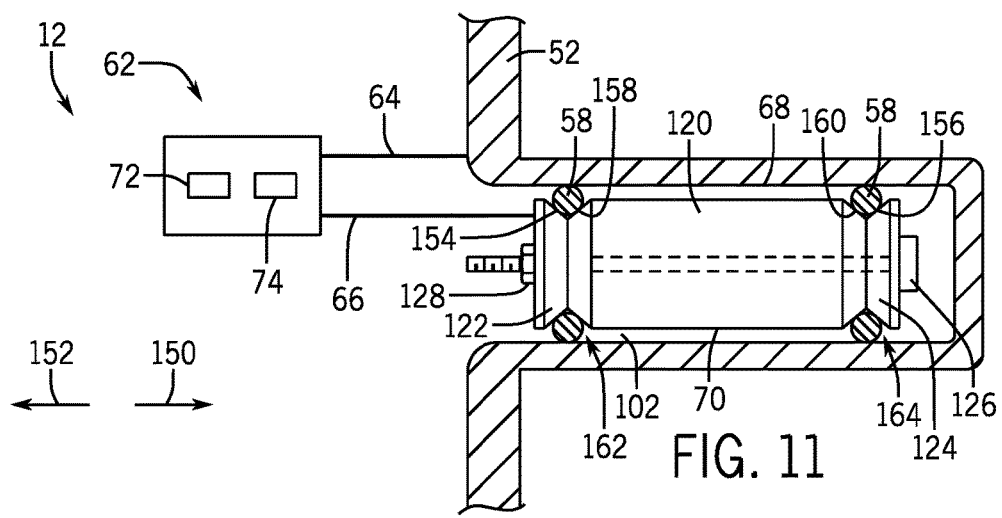
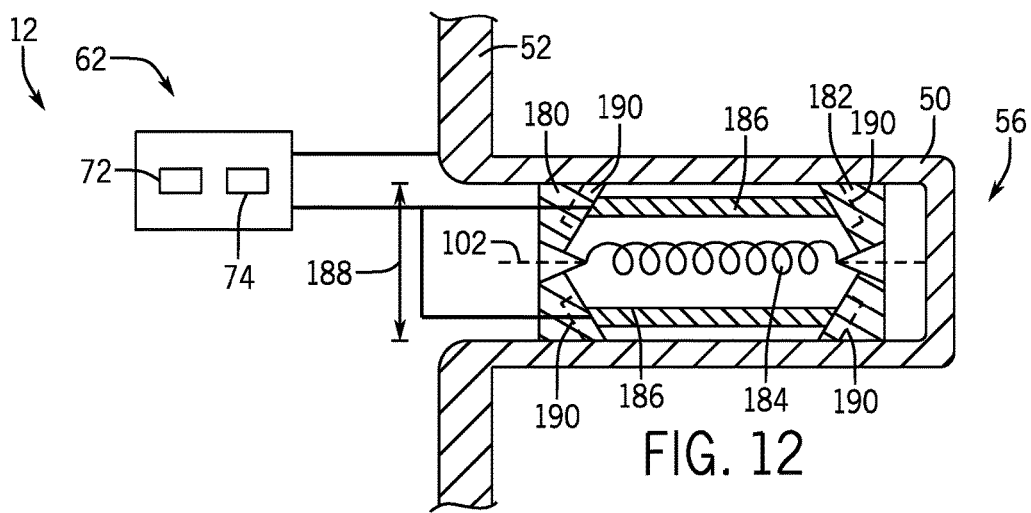

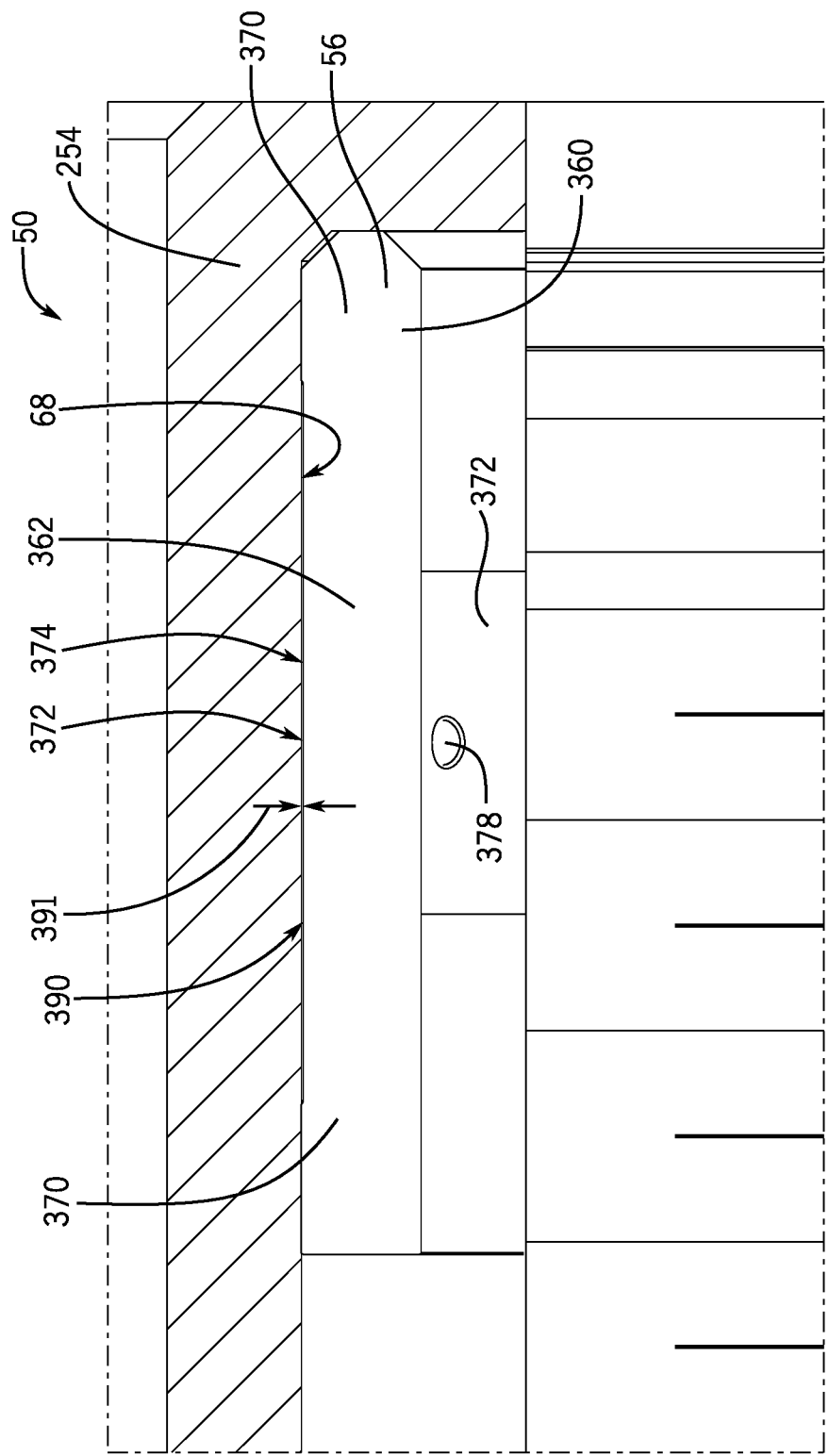

SYSTEM AND METHOD FOR NON-INVASIVE CAPACITIVE PRESSURE MEASUREMENT

CROSS REFERENCE TO RELATED APPLICATION

This application claims benefit of and is a non-provisional of U.S. Provisional Patent Application No. 62/209,259, entitled "System and Method for Non-Invasive Capacitive Pressure Measurement", filed Aug. 24, 2015, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Hydrocarbon drilling and extraction operations, involve transporting and/or using high-pressure fluids (e.g., oil, gas, hydraulic fluid). For example, high-pressure oil and/or natural gas may flow through extraction equipment as it exits a well. Drilling and extraction operations may also use high-pressure hydraulic fluid to control equipment. In order to monitor and control the pressurized fluids, pressure sensors may be used. Unfortunately, existing pressure sensors may be invasive and less resistive to over pressurization.

BRIEF DESCRIPTION OF THE DRAWINGS

Various features, aspects, and advantages of the present invention will become better understood when the following detailed description is read with reference to the accompanying figure, wherein:

FIG. 10 is a partial cross-sectional view of an embodiment of a non-invasive capacitive pressure measurement system with a core outside of a housing;

FIG. 11 is a partial cross-sectional view of an embodiment of a non-invasive capacitive pressure measurement system with a core within a housing;

FIG. 12 is a cross-sectional view of an embodiment of a non-invasive capacitive pressure measurement system;

FIG. 26 is a cross section of an embodiment of the housing with the core of FIGS. 24 and 25 disposed in a core housing portion of the housing.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Embodiments of the present disclosure are directed toward a non-invasive capacitive pressure measurement system capable of detecting fluid pressure using a capacitor. The non-invasive capacitive pressure measurement system includes a housing and a core separated by an insulative material to form a capacitor. In operation, the housing is exposed to a pressurized fluid that compresses the housing radially inward. As the housing moves radially inward, the housing compresses the insulative material against the core changing the thickness of the insulative material and therefore the distance between the core and the housing. The change in distance between the housing and core changes the capacitance of the non-invasive capacitive pressure measurement system. For example, as the distance between the housing and core decreases the capacitance increases, and likewise when the distance between the housing and core increases the capacitance decreases. In this way, the non-invasive capacitive pressure measurement system enables non-invasive pressure measurement (e.g., pressure measurement without direct contact with the fluid) by correlating a capacitance to a fluid pressure.

Figure 1:
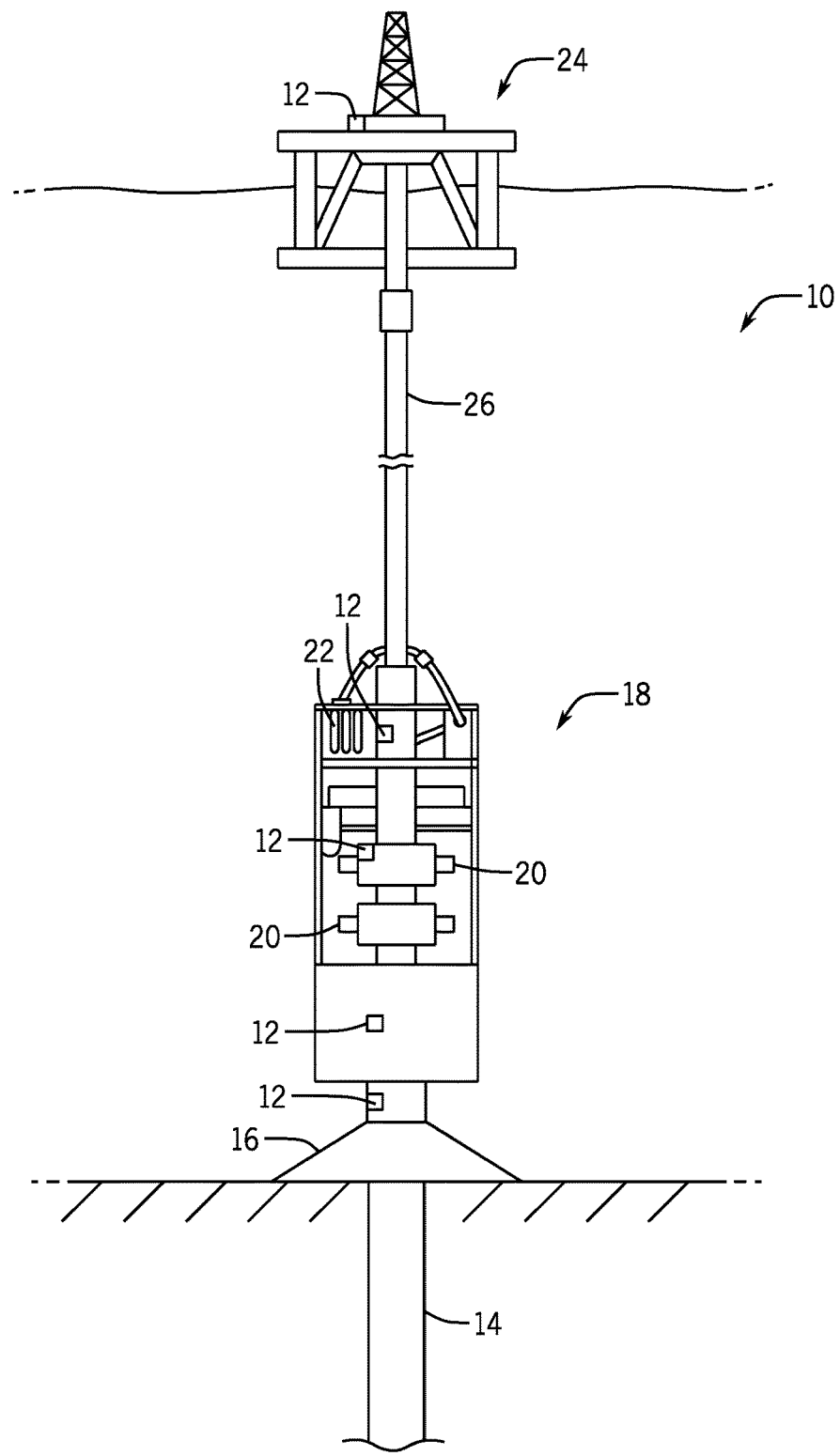
FIG. 1 is a schematic of an embodiment of a hydrocarbon extraction system.

FIG. 1 is a schematic of an embodiment of a hydrocarbon extraction system 10 used to extract hydrocarbons (e.g., oil and/or natural gas) as well as inject substances, such as chemicals, steams, or other fluids to enhance hydrocarbon extraction. In order to monitor and/or control the flow of fluids into, through, and out of the hydrocarbon extraction system 10, the hydrocarbon extraction system 10 may include one or more non-invasive capacitive pressure measurement systems 12. As will be explained in detail below, the non-invasive capacitive pressure measurement systems 12 enable non-invasive high-pressure measurement of fluid (e.g., pressure measurement without direct contact with the fluid) passing through the hydrocarbon extraction system 10. For example, the non-invasive capacitive pressure measurement systems 12 may enable pressure measurement up to and exceeding 1,000,000 PSI (e.g., 0-100,000 PSI, 0-250,000 PSI, 0-500,000 PSI, 0-750,000 PSI, 0-1,000,000 PSI).

As illustrated, the hydrocarbon extraction system 10 couples to a well 14 with a wellhead 16. During operation, oil and/or natural gas flow out of the well 14 through the wellhead 16 and into the wellhead stack 18. The wellhead stack 18 generally includes a series of devices and components that control and regulate activities and conditions associated with the well 16. For example, the wellhead stack 18 may include blowout preventers 20, accumulators 22, valves, plugs, seals, etc. that enable the hydrocarbon extraction system 10 to control the flow of fluid (e.g., oil, natural gas, hydraulic fluid, chemicals). The wellhead stack 18 in turn fluidly couples to the surface (e.g., a rig/platform 24) with risers 26, enabling fluid flow into and out of the well 14.

During drilling and production operations, the hydrocarbon system 10 is often exposed to extreme conditions. For example, during drilling and production of a well 14, some of the equipment in the hydrocarbon system 10 may be exposed to pressures up to and exceeding 10,000 pounds per square inch (PSI). Therefore, the hydrocarbon extraction system 10 generally employs various mechanisms, such as seals, plugs, and valves, to control and regulate the well 16. For example, the BOPs 20 may provide emergency fluid pressure containment in the event that a sudden pressure surge escapes from the well 14. Accordingly, it is in this difficult environment that the non-invasive capacitive pressure measurement system 12 enables fluid pressure measurement to control and/or monitor fluid pressure.

Figure 2:
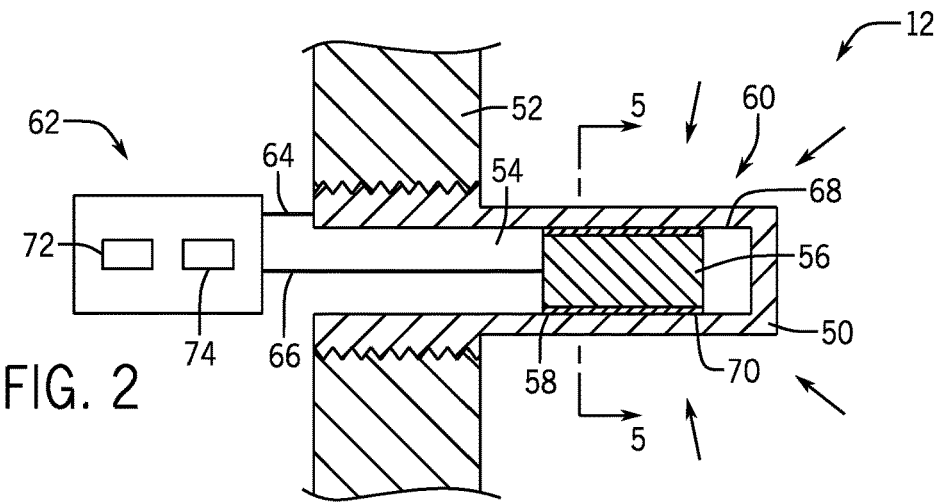
FIG. 2 is a cross-sectional view of an embodiment of a non-invasive capacitive pressure measurement system.
Figure 3:
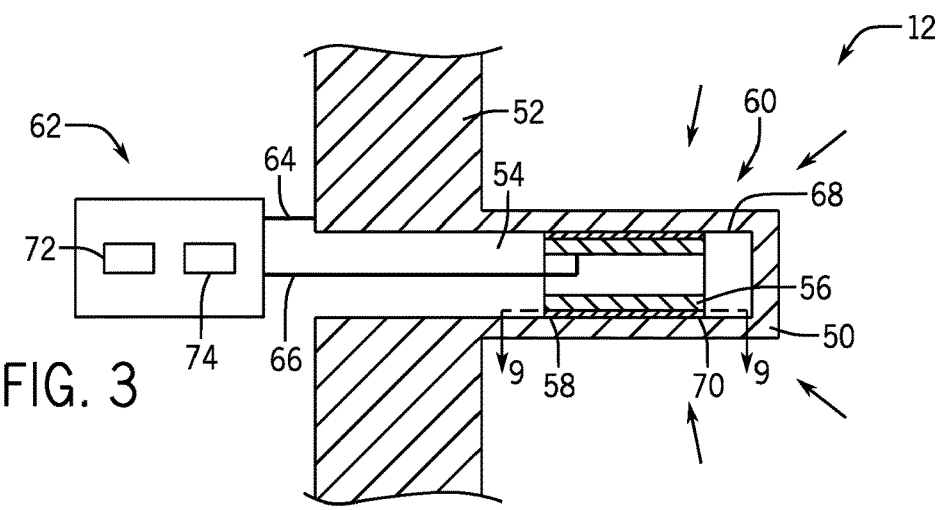
FIG. 3 is a cross-sectional view of an embodiment of a non-invasive capacitive pressure measurement system.

FIG. 2 is a cross-sectional view of an embodiment of a non-invasive capacitive pressure measurement system 12. The non-invasive capacitive pressure measurement system 12 includes a housing 50 (e.g., conductive housing) coupled to a pressure vessel wall 52 (e.g., pipe, container, etc.). For example, the housing 50 may be threadingly coupled, bolted, welded, or a combination thereof to the pressure vessel wall 52. Moreover, FIG. 3 illustrates that the housing 50 may be formed as part of the pressure vessel wall 52 (e.g., one-piece, integral) instead of mechanically coupled, welded, brazed, etc. In this way, the housing 50 is exposed to pressurized fluid within the pressure vessel wall 52.

The housing 50 (e.g., cylinder) includes a cavity 54 enabling the housing 50 to receive a core 56 (e.g., conductive core) and an insulative material 58 (e.g., rubber, plastic, ceramic, elastomer, etc.). The insulative material 58 separates the core 56 from the housing 50 to form a capacitor 60 using an electrical signal from the controller 62. In operation, the non-invasive capacitive pressure measurement system 12 detects the fluid pressure by monitoring the change in capacitance between the housing 50 and the core 56. For example, as the fluid pressure increases, the housing 50 compresses the insulative material 58 and change the distance between the housing 50 and the core 56, thus increasing the capacitance between the core 56 and the housing 50. Likewise, as pressure decreases the insulative material 58 is able to expand and decrease the capacitance between the core 56 and the housing 50. In this way, the non-invasive capacitive pressure measurement system 12 measures capacitance and correlates it to a change in fluid pressure enabling non-intrusive pressure monitoring of a fluid. In some embodiments, the core 56 and housing 50 may be made out of the same materials (e.g., conductive, non-conductive, metal) to reduce measurement interference from thermal expansion and contraction of the core 56 and housing 50.

As illustrated, the controller 62 electrically couples to the conductive housing 50 with a wire 64 and to the conductive core 56 with a wire 66 enabling the controller 62 to form the capacitor 60 with the electrical signal. In order to control the electrical signal and measure changes in capacitance, the controller 62 may include a processor 72 that executes instructions stored on a memory 74. In some embodiments, the controller 62 may control equipment (e.g., valves, BOP, etc.) in the hydrocarbon extraction system 10 in response to the measured fluid pressure.

In some embodiments, the housing 50 and/or core 56 may be formed out of a non-conductive material, but with a conductive coating or layer (e.g., metal coating or layer). For example, the housing 50 may include a conductive coating or layer on an interior surface 68 while the core 56 includes a conductive coating or layer on an exterior surface 70 enabling the housing 50 and the core 56 to form the capacitor 60. Furthermore, in some embodiments, the core 56 may be solid, which increases the crush resistance of the non-invasive capacitive pressure measurement system 12 (e.g., housing) to pressures up to and in excess of 1,000,000 PSI. In some embodiments, the core 56 may be hollow, as illustrated in FIG. 3.

Figure 4:
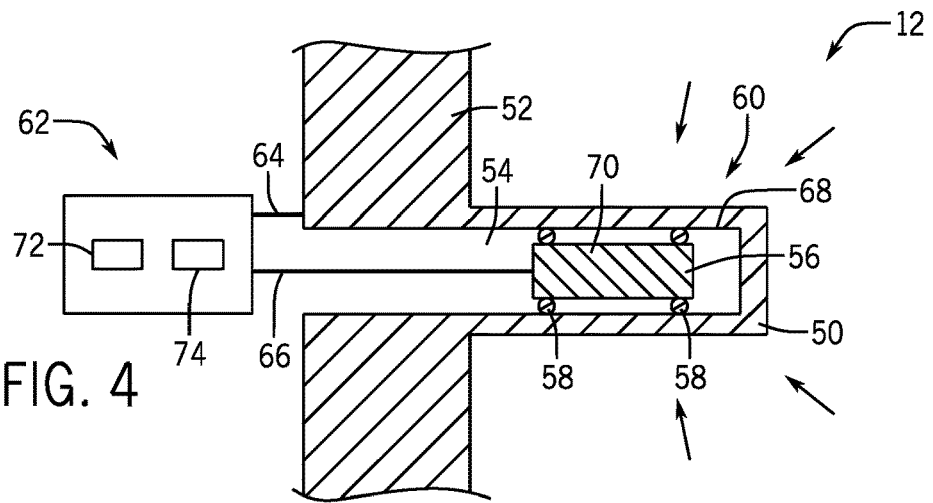
FIG. 4 is a cross-sectional view of an embodiment of a non-invasive capacitive pressure measurement system.

FIG. 4 is a cross-sectional view of an embodiment of a non-invasive capacitive pressure measurement system 12. In some embodiments, the insulative material 58 may circumferentially wrap around the outer surface 70 of the core 56, instead of extending along the axis of the core 56. For example, the insulative material include annular sleeves or o-rings that extend about the circumference of the core 56. In some embodiments, the non-invasive capacitive pressure measurement system 12 may include additional o-rings (e.g., 1, 2, 3, 4, 5, or more) and/or combine insulative material pieces 58 that extends both axially along the core 56 as well as circumferentially about the core 56.

Figure 5:
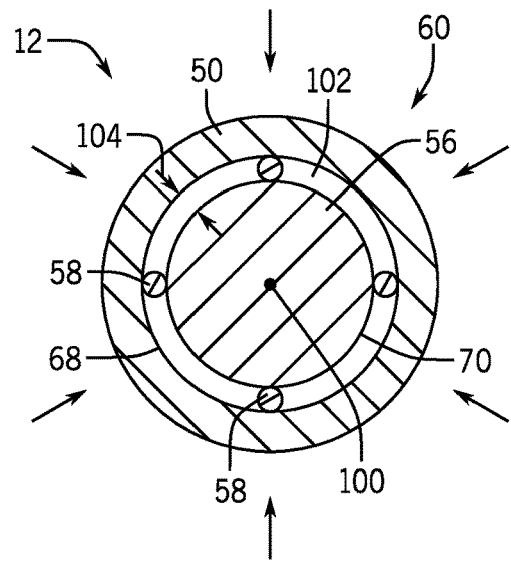
FIG. 5 is a cross-sectional view of an embodiment of a non-invasive capacitive pressure measurement system in an uncompressed state along line 5-5 of FIG. 2.

FIG. 5 is a cross-sectional view of an embodiment of a non-invasive capacitive pressure measurement system 12 in an uncompressed state along line 5-5 of FIG. 2. As illustrated, the non-invasive capacitive pressure measurement system 12 may include multiple pieces of insulative material 58 spaced (e.g., equally spaced) circumferentially about an axis 100 of the core 56 within a gap 102 (e.g., circumferential gap). While four pieces of insulative material 58 are illustrated, some embodiments may include 2, 3, 4, 5, or more pieces of insulative material 58 that separate the housing 50 from the core 56. Moreover, the insulative material 58 may have a variety of cross-sectional shapes including circular, oval, square, rectangular, semi-circular, etc. In an uncompressed state, the insulative material 58 maximizes a distance 104 (e.g., radial distance) between the interior surface 68 of the housing and the outer surface 70 of the core 56, thus reducing the capacitance between the core 56 and the housing 50.

Figure 6:
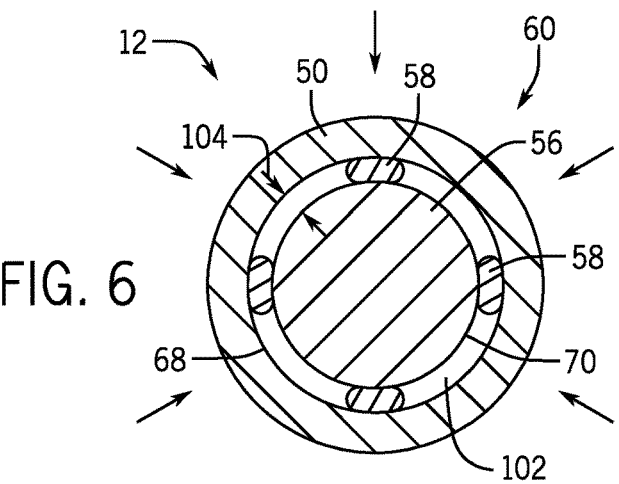
FIG. 6 is a cross-sectional view of an embodiment of a non-invasive capacitive pressure measurement system in a compressed state along line 5-5 of FIG. 2.

FIG. 6 is a cross-sectional view of an embodiment of a non-invasive capacitive pressure measurement system 12 of FIG. 5 in a compressed state. In operation, the housing 50 compresses radially inward when exposed to pressurized fluid. As the housing 50 compresses radially inward, the housing 50 compresses the insulative material 58 between the inner surface 68 of the housing 50 and the outer surface 70 of the core 56, causing a reduction in the distance 104. The decrease in the distance 104 increases the capacitance between the housing 50 and the core 56. As explained above, the controller 62 measures the change in the capacitance and then correlates the change in capacitance to the pressure of the fluid compressing the housing 50, thus enabling non-invasive fluid pressure measurement. For example, the controller 62 (e.g., memory) may contain a lookup table(s), an equation, computer model, etc. that enables the controller 62 to determine pressure through a correlation with capacitance.

Figure 7:
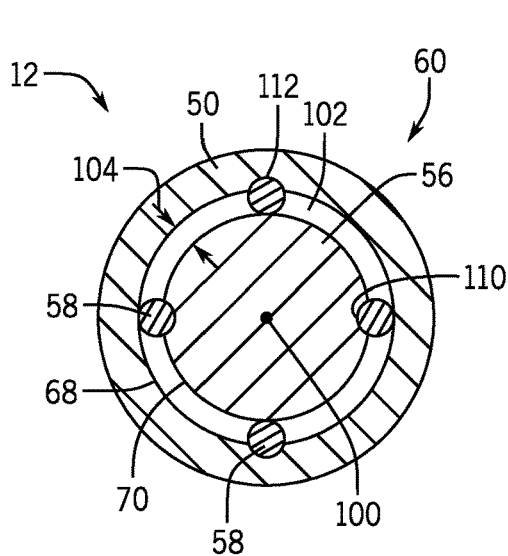
FIG. 7 is a cross-sectional view of an embodiment of a non-invasive capacitive pressure measurement system along line 5-5 of FIG. 2.

FIG. 7 is a cross-sectional view of an embodiment of a non-invasive capacitive pressure measurement system 12 along line 5-5 of FIG. 2. In some embodiments, the core 56 and/or the housing 50 may include respective grooves 110 and 112 that receive the same or a different insulative material 58. In operation, the grooves 110 and 112 resist and/or block the insulative material 58 from moving circumferentially about the axis 100 of the core 56, thereby maintaining an equal or substantially equal distance between the core 56 and the housing 50.

Figure 8:
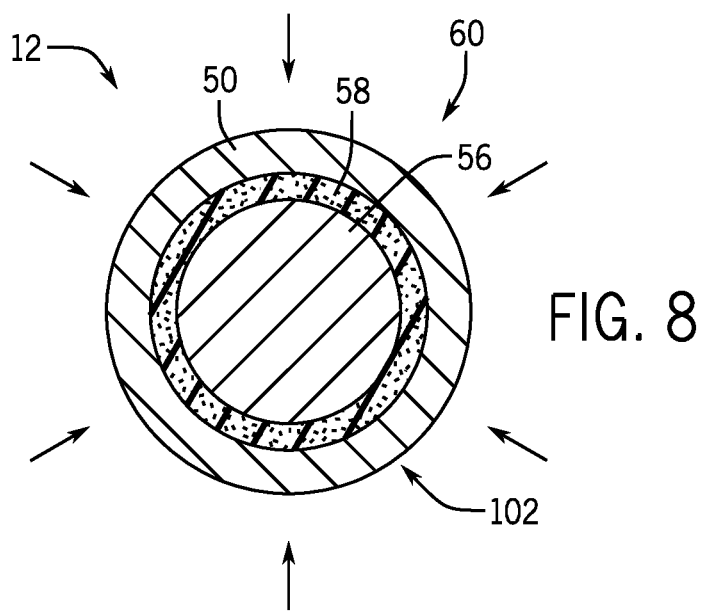
FIG. 8 is a cross-sectional view of an embodiment of a non-invasive capacitive pressure measurement system along line 5-5 of FIG. 2.

FIG. 8 is a cross-sectional view of an embodiment of a non-invasive capacitive pressure measurement system 12 along line 5-5 of FIG. 2. As illustrated, the non-invasive capacitive pressure measurement system 12 may fill the gap 102 with an insulative material 58. For example, the insulative material 58 may be foam. In operation, the insulative material maintains the core 56 and the housing 50 in an equidistant relationship while still enabling the housing 50 to compress under pressure and change the capacitance between the housing 50 and the core 56.

Figure 9:
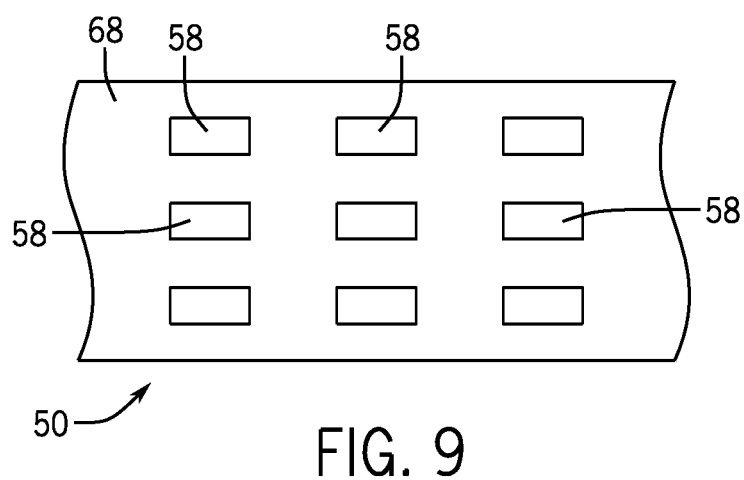
FIG. 9 is a sectional view of an embodiment of a non-invasive capacitive pressure measurement system along line 9-9 of FIG. 3.

FIG. 9 is a sectional view of an embodiment of a non-invasive capacitive pressure measurement system 12 along line 9-9 of FIG. 3. In some embodiments, the insulative material 58 may include multiple inserts (e.g., 1, 2, 3, 4, 5, 10, 15, or more) that couple about the interior surface 68 of the housing 50 to maintain the distance 104 between the core 56 and the housing 50. For example, the insulative material inserts 58 may be glued and/or inserted into apertures in the housing 50. The inserts may also have any number of shapes including circular, oval, square, triangular, etc. In some embodiments, the insulative material inserts 58 may couple to the core 56 or to the core 56 and the housing 50. Moreover, the inserts may be arranged into rows, columns, rings, and/or have irregular placement.

FIG. 10 is a partial cross-sectional view of an embodiment of a core 56 (e.g., core assembly) outside of a housing 50. As illustrated, the core 56 includes a body 120 with a first end cap 122 and a second end cap 124. In order to couple the first end cap 122 and the second end cap 124 to the body 120, the core 56 includes a fastener 126 (e.g., threaded fastener or bolt) with a mating fastener 128 (e.g., threaded fastener or nut). In FIG. 10 the first end cap 122 and the second end cap 124 are in a relaxed or uncompressed position with respect to the body 120. In this position, the insulative material 58 (e.g., o-rings) are similarly relaxed and unstretched to facilitate insertion of the core 56 into the housing cavity 54. In some embodiments, the first and second end caps 122, 124 may be not be conductive.

FIG. 11 is a partial cross-sectional view of an embodiment of a core 56 within the housing 50. Once the core 56 is inserted into the housing 50, the nut 128 may be threaded onto the fastener 126. When the nut 128 threads onto the fastener 126 in axial direction 150, the nut 128 axially compresses the first end cap 122 against the body in axial direction 150 and the second end cap 124 against the body 120 in axial direction 152. The axial compression of the first end cap 122 and the second end cap 124 against the body 120 radially stretches or expands the insulative material 58 and drives the insulative material 58 radially outward and into contact with the housing 50. In this position, the insulative material 58 forms the gap 102 between the housing interior surface 68 and outer surface 70 of the core 56. To facilitate the insulative material 58 radially outward, the first and second end caps 122, 124 may have tapered and/or curved circumferential surfaces 154, 156 that correspond with tapered and/or curved surfaces 158, 160 on the body 120. Together, these tapered and/or curved surfaces 154, 156, 158, and 160 form grooves 162 and 164 (e.g., annular grooves with tapered or curved cross-section) that facilitate expansion of the insulative material 58 and resist axial movement of the insulative material 58 in axial directions 150 and 152.

FIG. 12 is a cross-sectional view of an embodiment of a non-invasive capacitive pressure measurement system 12. In FIG. 12, the core 56 (e.g., core assembly) includes insulative first and second end caps 180 and 182 that couple together with a spring 184 (e.g., coiled spring) in tension. As illustrated, the spring 184 axially compresses the conductive plates or rods 186 between the first and second end caps 180 and 182. In order to insert the core 56 into the housing 50, the first and second end caps 180 and 182 are pulled away from one another in axial directions 150 and 152 to compress the end caps 180 and 182 about the axis 102, which reduces the diameter 188 of the core 56. Furthermore, as the end caps 180 and 182 axially compress toward one another, the rods 186 slide radially outward in slots 190. Once inside the cavity 154, the end caps 180, 182 expand and the rods 186 slide radially inward toward the axis 102 within the slots 190. The radially inward and outward movement of the rods 186 in the slots 190 enables the core 56 to vary the capacitance between the housing 50 and the rods 186. For example, as the housing 50 radially compresses, the end caps 180, 182 radially compress and move axially away from one another in axial directions 150 and 152. As the end caps 180, 182 move axially away from one another, the rods 190 move radially outward in the slots 190. Similarly, when the pressure on the housing 50 decreases, the spring 184 pulls the end caps 180, 182 closer together in the axial direction and the rods 186 move radially inward. In this way, as the pressure on the housing 50 changes the position of the rods 186, the capacitance between the housing 50 and the rods 186 of the core 56 changes, which enables pressure detection via a correlation between pressure and capacitance.

Figure 13:
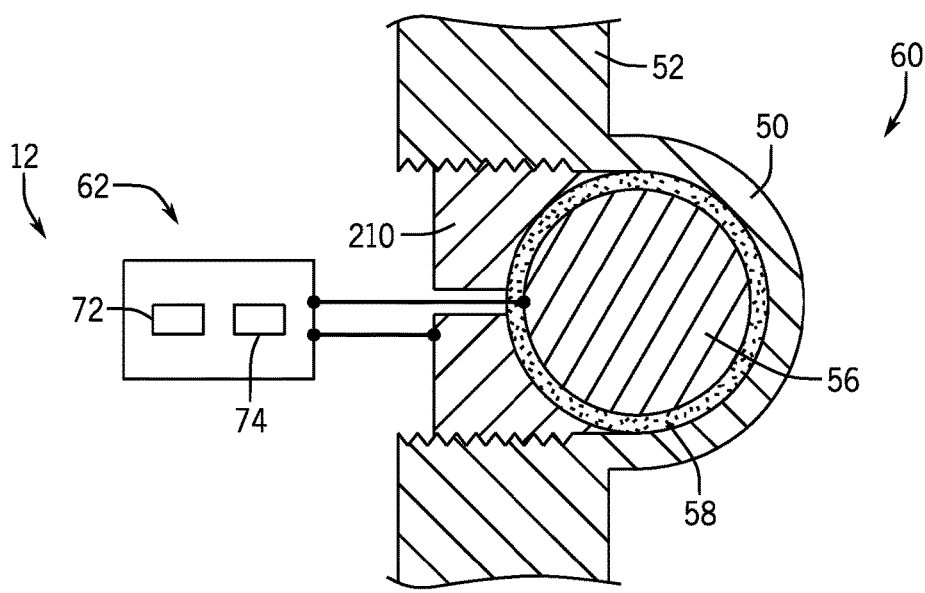
FIG. 13 is a cross-sectional view of an embodiment of a non-invasive capacitive pressure measurement system with a spherical core.
Figure 14:
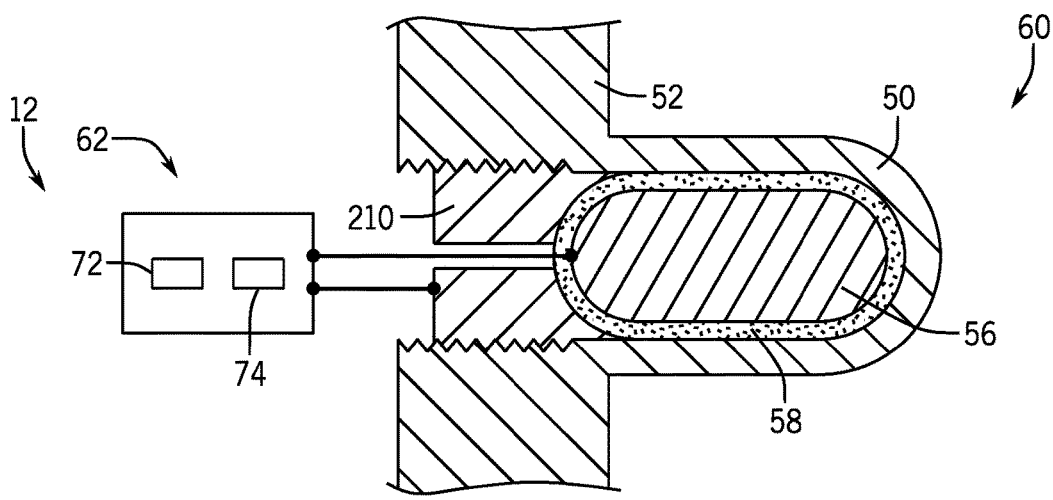
FIG. 14 is a cross-sectional view of an embodiment of a non-invasive capacitive pressure measurement system with a oval core.

FIGS. 13 and 14 are cross-sectional views of embodiments of a non-invasive capacitive pressure measurement system 12 with a respective spherical core 56 (e.g., ball shaped, round) and semi-spherical housing 50; and an oval core 56 and oval-shaped housing 50. In order to measure capacitance changes indicative of the pressure changes, the non-invasive capacitive pressure measurement system 12 includes a retaining member 210 (e.g., threaded fastener, stud, plug) that threads into the housing 50 or wall 52 to retain the spherical core 56 within the semi-spherical housing 52; and the oval shaped core 56 within the oval shaped housing 50. In this way, as pressure acts on the housing 50, the housing 50 does not drive the spherical core 56 or oval shaped core 56 out of the housing 50. As explained above, the non-invasive capacitive pressure measurement system 12 includes insulative material 56 between the housing 50 and the core 56 in order to form a capacitor 60. The insulative material 58 may be foam that completely encases the core 56; inserts that couple to the core 56, housing 50, and/or retaining member 210; or pieces of insulative material that wrap around the core 56.

Figure 15:
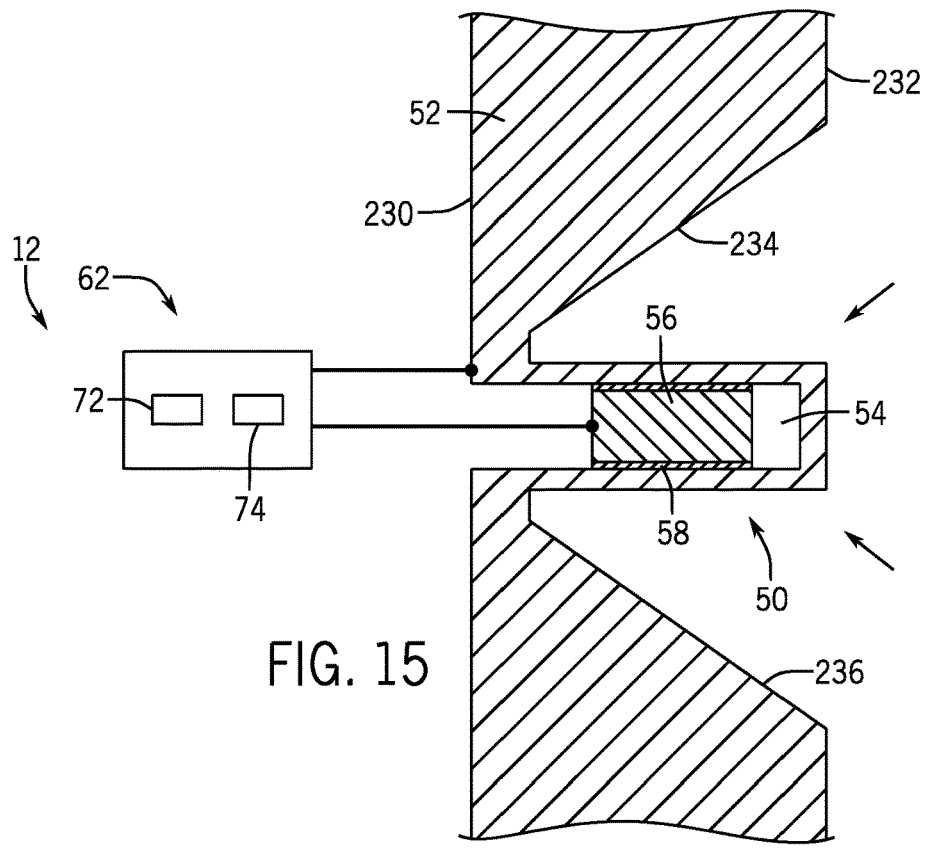
FIG. 15 is a cross-sectional view of an embodiment of a non-invasive capacitive pressure measurement system.

FIG. 15 is a cross-sectional view of an embodiment of a non-invasive capacitive pressure measurement system 12 protected by the wall 52. As illustrated, the non-invasive capacitive pressure measurement system 12 may rest between an outer surface 230 and an inner surface 232 of the pressure vessel wall 52. In this way, the wall 52 may shield or protect the non-invasive capacitive pressure measurement system 12 from debris flowing through a pressure vessel (e.g., a pipe, casing, etc.). Moreover, the wall 52 may include sloped or tapered portions 234, 236 that reduce buildup of formations or deposits (e.g., hydrates) as fluid flows around or past the housing 50.

Figure 16:
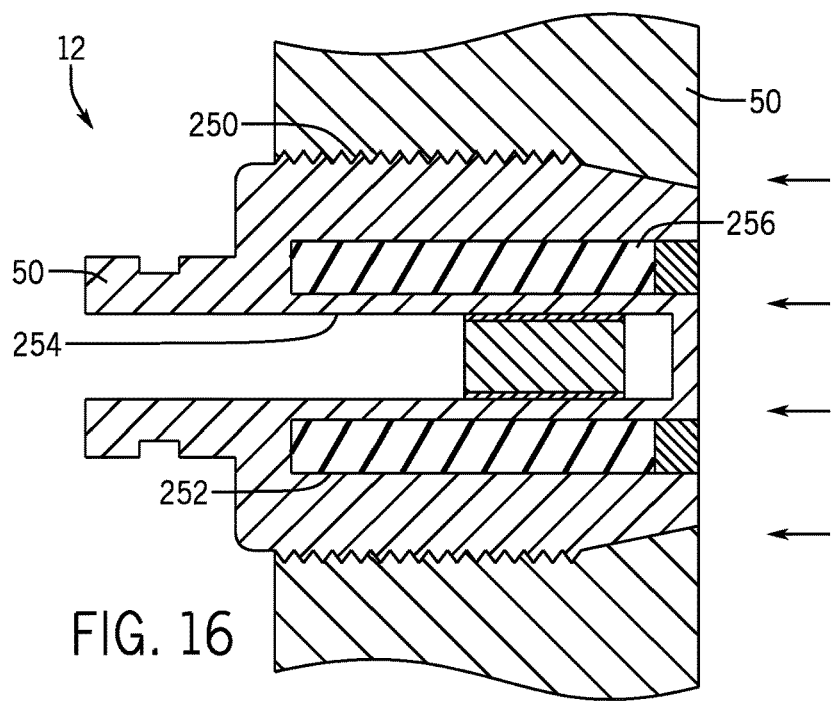
FIG. 16 is a cross-sectional view of an embodiment of a non-invasive capacitive pressure measurement system.

FIG. 16 is a cross-sectional view of an embodiment of a non-invasive capacitive pressure measurement system 12 capable of incorporation into an existing system with limited or no retrofit. For example, the non-invasive capacitive pressure measurement system 12 may be an integral unit (e.g., threaded plug) capable of insertion into an existing aperture 250 (e.g., threaded aperture) in a pressure vessel wall 52. As illustrated, the housing 50 includes a slot 252 (e.g., cylindrical) in order to expose a core housing portion 254 surrounding the core 56 to fluid pressure, while simultaneously protecting the core housing portion 254 from fluid flow. In some embodiments, the non-invasive capacitive pressure measurement system 12 may include an insulative material 256 (e.g., rubber) that transfers pressure from the fluid to the core housing portion 254 while blocking fluid from entering the cylindrical slot 252. In order words, the insulative material 256 may block hydrate formation or deposit formation within the slot 252. In order to retain the insulative material within the slot 252 the non-invasive capacitive pressure measurement system 12 may include a ring 258 (e.g., a c-ring) that retains the insulative material 256 within the slot 252.

Figure 17:
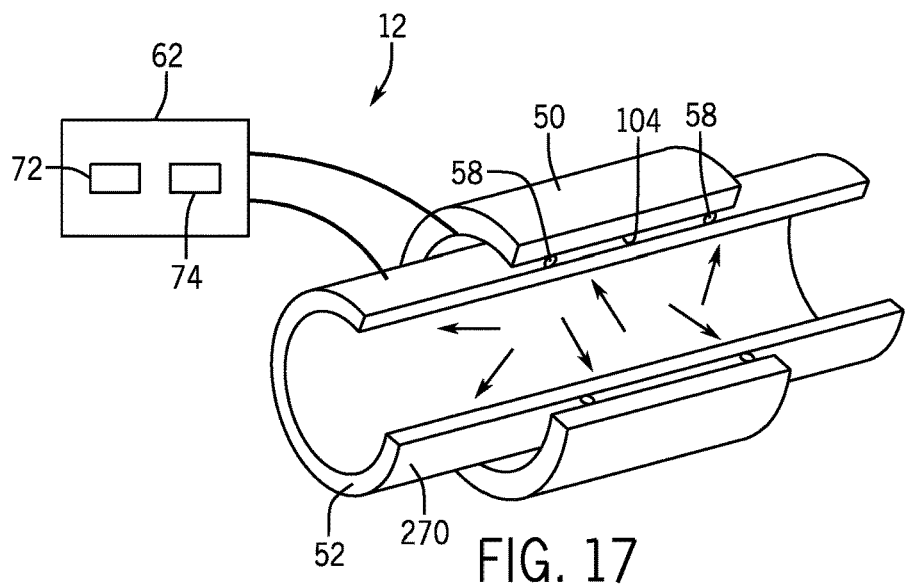
FIG. 17 is a perspective partial cross-sectional view of an embodiment of a non-invasive capacitive pressure measurement system.

FIG. 17 is a perspective cutaway view of an embodiment of a non-invasive capacitive pressure measurement system 12 that couples around an exterior surface 270 of a pressure vessel wall 52 (e.g., pipe, casing, etc.). In operation, the insulative material 58 compresses between the housing 50 and the pressure vessel wall 52 as the pressure vessel wall 52 radially expands under pressure. As explained above, the housing 50 and the pressure vessel wall 52 form a capacitor that changes in capacitance as the distance 104 between the housing 50 and the pressure vessel 50 decrease. In this way, the non-invasive capacitive pressure measurement system 12 may wrap around a pressure vessel wall 52 and enable pressure measurement of a fluid in a pressure vessel.

Figure 18:
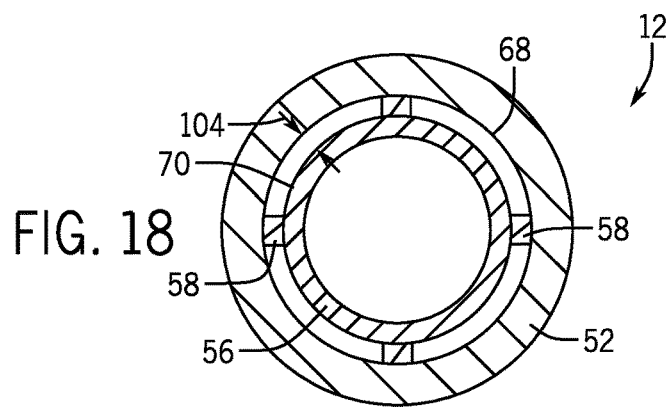
FIG. 18 is a cross-sectional view of an embodiment of an uncompressed non-invasive capacitive pressure measurement system along line 5-5 of FIG. 2.
Figure 19:
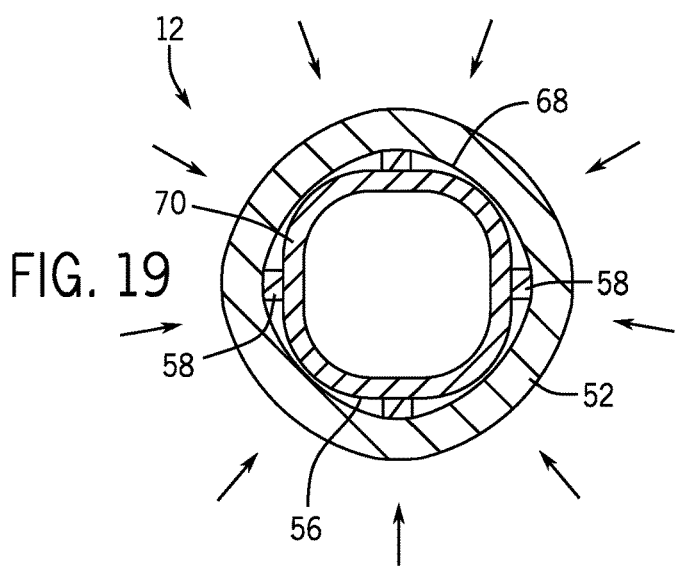
FIG. 19 is a cross-sectional view of an embodiment of a compressed non-invasive capacitive pressure measurement system along line 5-5 of FIG. 2.

FIGS. 18 and 19 illustrate cross-sectional views of an embodiment of a non-invasive capacitive pressure measurement system 12 along line 5-5 of FIG. 2. Specifically, FIG. 18 illustrates the non-invasive capacitive pressure measurement system 12 in an uncompressed state and FIG. 19 the non-invasive capacitive pressure measurement system 12 in a compressed state. However, in contrast to the insulative material 58 discussed above, the insulative material 58 in FIGS. 18 and 19 may be an incompressible or substantially incompressible material (e.g., ceramic, etc.). Accordingly, instead of compressing the insulative material 58 to decrease the distance between the housing 50 and the core 56, the core 56 flexes to change the distance 104 between the housing 50 and the core 56. Indeed, FIG. 19 illustrates the housing 50 under pressure with the core 56 flexing between the insulative material 58 as the cylinder 50 compresses the insulative material 58 into the core 56.

Figure 20:
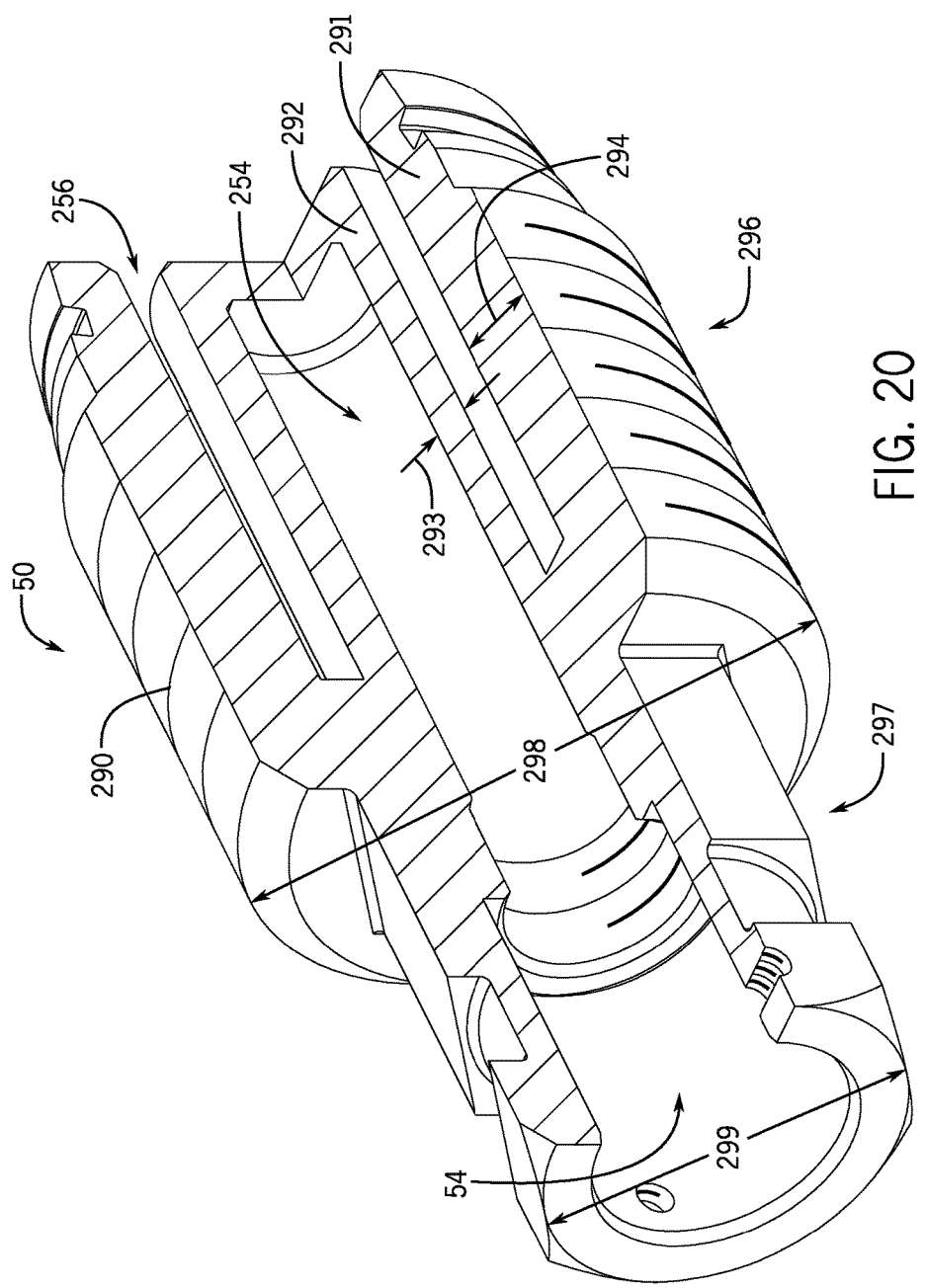
FIG. 20 is a perspective view of an embodiment of the housing of the non-invasive capacitive pressure measurement system.

FIG. 20 is a perspective view of an embodiment of the housing 50 that may be exposed to fluid flow (e.g., through a Christmas tree, through a well plug, or through another tubular configured to flow a fluid). As shown in the illustrated embodiment of FIG. 20, the housing 50 (e.g., annular housing) may include threads 290, such that the housing 50 may be removably disposed in the aperture 250 of the pressure vessel wall 52. Additionally, the housing 50 may include the cavity 54 (e.g., annular or cylindrical cavity) configured to receive the core 56, such that a pressure of the fluid flow may be monitored. For instance, the fluid flow may surround the core housing portion 254 by flowing into the slot 256 (e.g., annular or cylindrical slot) formed by an outer annular wall 291 and an inner annular wall 292. In some embodiments, the inner annular wall 292 may include a first thickness 293 less than a second thickness 294 of the outer annular wall 291. The first thickness 293 may be less than the second thickness 294 to facilitate movement of the inner annular wall 292 caused by a pressure of the fluid flow in the slot 256. For example, the fluid flow may exert a pressure force on the inner annular wall 292, such that the inner annular wall 292 moves radially inward and/or radially outward. Additionally, the second thickness 294 may be greater than the first thickness 293 to enhance a durability of the housing 50 (e.g., the outer annular wall 291 is exposed to the fluid flow). In some embodiments, the housing 50 may include a metal alloy material configured to withstand relatively harsh environments (e.g., high temperature and/or high pressure). For example, the housing 50 may include a nickel alloy such as Inconel. In other embodiments, the housing 50 may include another suitable conductive material (e.g., a metallic material).

As shown in the illustrated embodiment of FIG. 20, the housing 50 may include a first portion 296 (e.g., first annular portion) and a second portion 297 (second annular portion). The first portion 296 may include the threads 290, the core housing portion 254, and/or the slot 256. Accordingly, the first portion 296 may include a first diameter 298 greater than a second diameter 299 of the second portion 297. In some embodiments, the second portion 297 may extend (e.g., protrude) from the pressure vessel wall 52 away from a bore configured to flow the fluid. Accordingly, the second portion 297 may be isolated from the fluid flow. In certain embodiments, the controller 62 (and/or other electronic equipment such as a circuit board) may be coupled to (and/or disposed within) the second portion 297 of the housing 50. Accordingly, the controller 62 may be coupled to the core 56 and configured to monitor changes in capacitance as pressure of the fluid flow changes.

Figure 21:
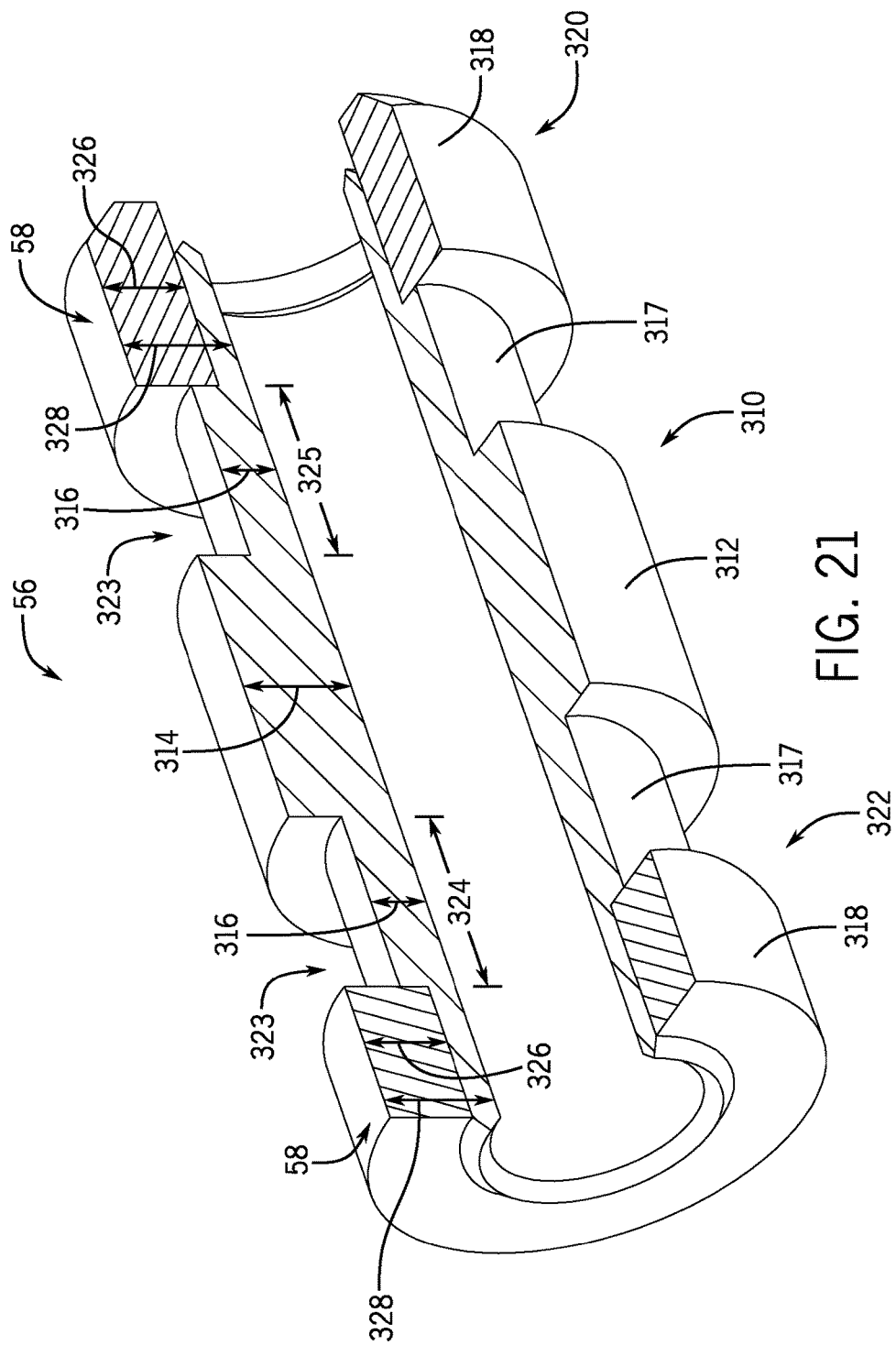
FIG. 21 is a perspective view of an embodiment of the core and insulative material configured to be disposed in the housing of FIG. 20.

FIG. 21 is a perspective view of an embodiment of the core 56 (e.g., annular core) and the insulative material 58 (e.g., one or more annular insulative structures) configured to be disposed in the housing 50 of FIG. 20. In some embodiments, the core 56 may include the same material as the housing 50. For example, the core 56 may include a nickel alloy, such as Inconel. When the core 56 includes the same material as the housing 50, thermal expansion experienced by the housing 50 and the core 50 as a result of high temperatures may be substantially the same. Accordingly, the non-invasive capacitive pressure measurement system 12 may determine the pressure of the fluid flow more accurately because a distance between the core 56 and the housing 50 may fluctuate as a result of pressure changes and not thermal expansion. In other embodiments, the core 56 may include another suitable conductive material (e.g., metallic material). In still further embodiments, the core 56 may include a different material from the housing 50 and/or be coated with the same or different material as the housing 50.

As shown in the illustrated embodiment of FIG. 21, the core 56 may include an annular body 310 with a center portion 312 (e.g., annular center portion) that includes a first thickness 314 greater than a second thickness 316 of end portions 317 (e.g., annular end portions) of the annular body 310. Accordingly, the first thickness 314 of the center portion 312 may position the center portion 312 proximate to the inner surface 68 of the housing 50, such that capacitance changes may be detected as a result of pressure forces from the fluid flow (e.g., as the pressure forces move the inner annular wall 292). In some embodiments, the end portions 317 of the annular body 310 may include the second thickness 316 to receive one or more insulator rings 318. The insulator rings 318 (e.g., the insulative material 58) may be disposed on a first end 320 of the annular body 310 and a second end 322 of the annular body 310, as shown in FIG. 21. In such embodiments, gaps 323 (e.g., annular gaps with axial lengths 324 and 325) may form between the insulator rings 318 and the center portion 312. However, in other embodiments, the insulator rings 318 may contact the center portion 312 of the annular body 310.

In any case, the insulator rings 318 may include a third thickness 326. When the insulator rings are disposed over the end portions 317, the insulator rings 318 and the end portions 317 form a fourth thickness 328 (e.g., a combined thickness of the second thickness 316 and the third thickness 326). The fourth thickness 328 may be greater than the first thickness 314, such that the insulator rings 318 are configured to contact the inner surface 68 of the housing 50 and form a gap (e.g., an annular gap spanning a radial distance; see FIG. 23) between the center portion 312 and the inner surface 68 of the housing 50. Establishing contact between the insulator rings 318 and the inner surface 68 of the housing 50 enables the insulator rings 318 to compress and/or decompress as pressure fluctuations in the fluid flow occur (e.g., as the inner annular wall 292 moves radially inward and/or radially outward). Accordingly, a radial distance between the center portion 312 and the inner surface 68 may change, causing a capacitance change, and thus, enabling the controller 62 to monitor the pressure of the fluid flow. In some embodiments, the insulator rings 318 may include a ceramic material and/or a ceramic coating. For example, the insulator rings 318 may include aluminum oxide, zirconium oxide, and/or another suitable ceramic material. In other embodiments, the insulator rings 318 may include any suitable insulating material.

Figure 22:
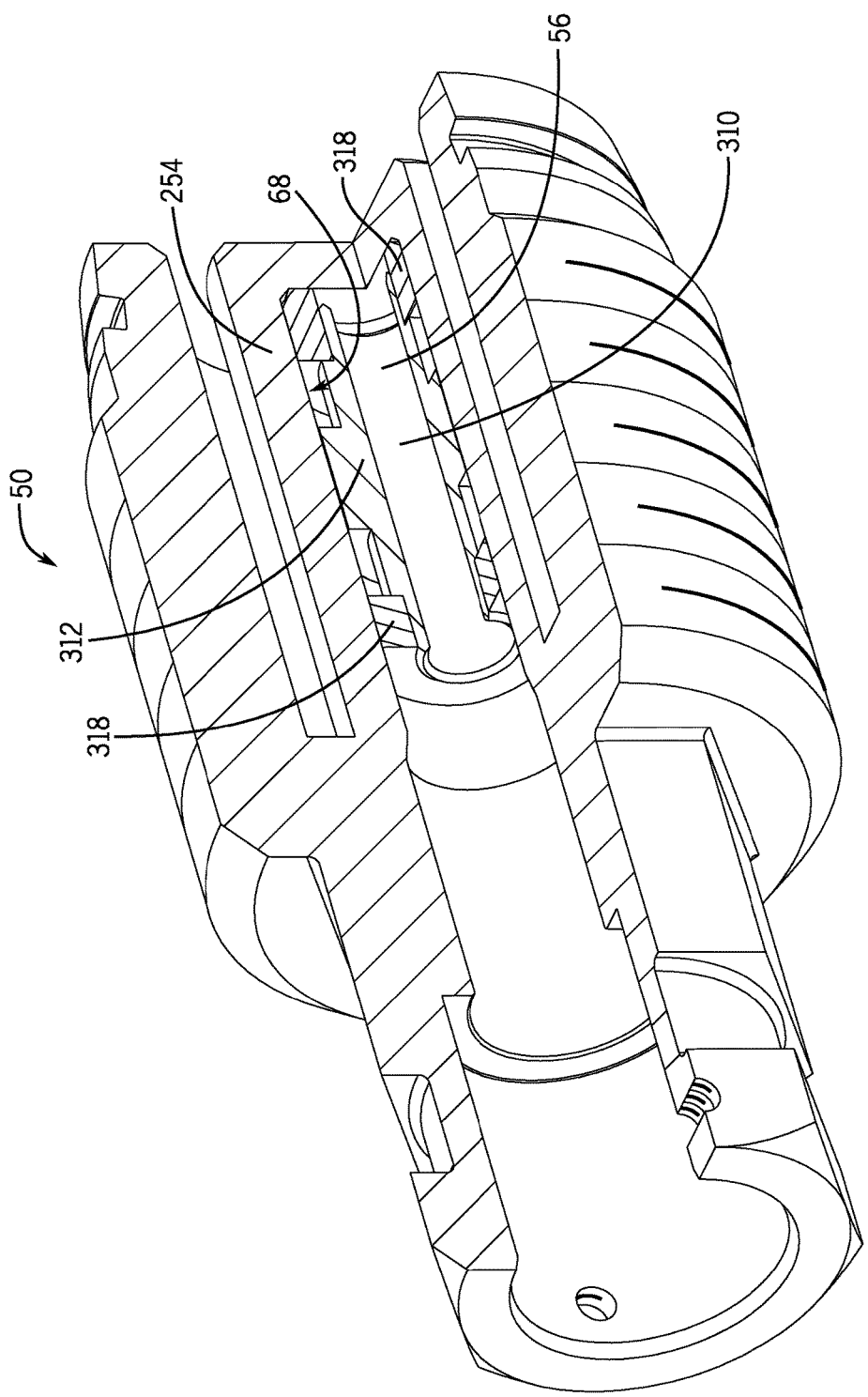
FIG. 22 is a perspective view of an embodiment of the core of FIG. 21 disposed in the housing of FIG. 20.

FIG. 22 is a perspective view of an embodiment of the core 56 of FIG. 21 disposed in the housing 50 of FIG. 20. In some embodiments, the housing 50 may undergo a heat shrink process when the core 56 is disposed in the core housing portion 254. For example, the housing 50 (e.g., the core housing portion 254) may expand when exposed to a heat source (e.g., increasing a temperature of the housing 50), thereby enabling the core 56 to be disposed in the core housing portion 254. When the heat source is removed (e.g., decreasing the temperature of the housing 50), the housing 50 (e.g., the core housing portion 254) may contract, thereby securing the core 56 within the housing 50. Heat shrinking the housing 50 when disposing the core 56 in the core housing portion 254 may reduce an amount of moisture present in the core housing portion 254 (e.g., the heat source evaporates some or all of the moisture in the core housing portion 254). Additionally, during the heat shrinking process, the core housing portion 254 may be purged with an inert gas (e.g., nitrogen ($N_2$), argon (Ar), and/or another suitable non-reactive substance) in order to remove excess air and/or any remaining moisture present in the core housing portion 254. In other embodiments, the inert gas may be directed into the core housing portion 254 to both remove excess air and/or moisture as well as to heat shrink the housing 50. In any case, an accuracy of the capacitance measurements between the center portion 312 of the annular body 310 and the inner surface 68 of the housing 50 may be enhanced.

Figure 23:
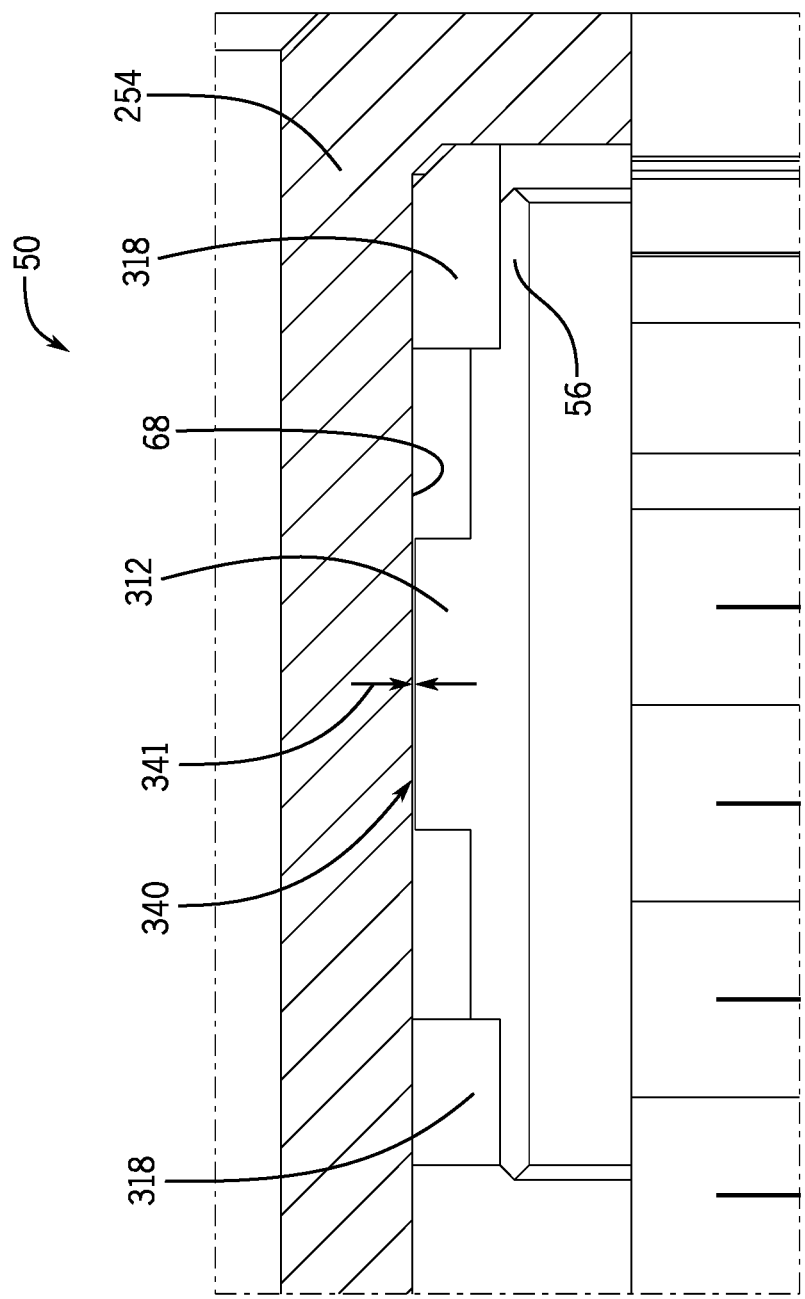
FIG. 23 is a cross section of an embodiment of the housing with the core of FIGS. 21 and 22 disposed in a core housing portion of the housing.

For example, FIG. 23 is a cross section of an embodiment of the housing 50 with the core 56 of FIG. 21 disposed in the core housing portion 254. As shown in the illustrated embodiment of FIG. 23, a gap 340 (e.g., an annular gap over a radial distance 341) is formed between the center portion 312 and the inner surface 68 of the housing 50. Further, the insulative rings 318 are contacting the inner surface 68 of the housing 50. In some embodiments, the gap 340 may represent an active area that includes an electric field between the inner surface 68 of the housing 50 and the core 56. Accordingly, it is desirable to reduce moisture and/or other contaminants within the core housing portion 254 because moisture and/or other contaminants may cause interference to the electric field in the gap 340. Therefore, moisture and/or other contaminants may cause feedback received by the controller 62 from the core 56 to inaccurately reflect an actual pressure of the fluid flow. Therefore, heat shrinking the housing 50 and/or purging the core housing portion 254 with an inert substance upon insertion of the core 56 may enhance the accuracy of the non-invasive capacitive pressure measurement system 12 to measure the pressure of the fluid flow.

Figure 24:
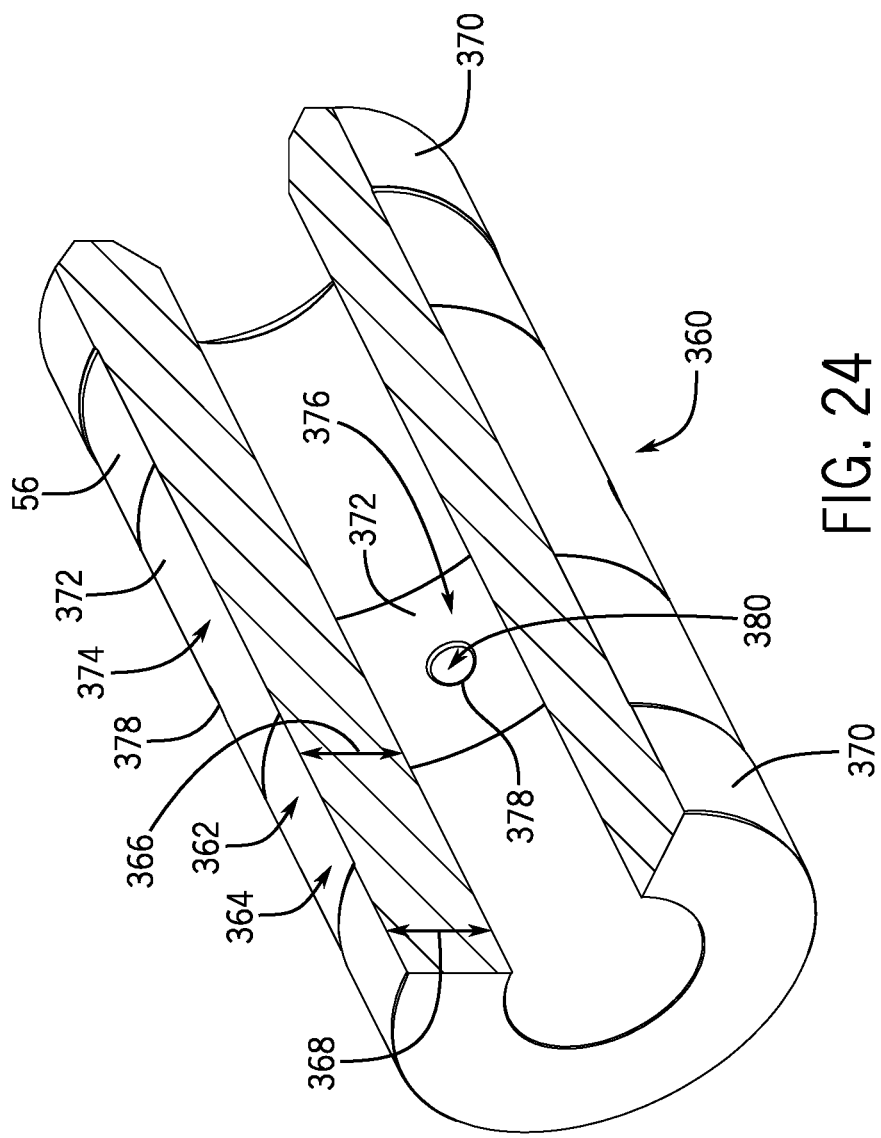
FIG. 24 is a perspective view of another embodiment of the core and insulative material configured to be disposed in the housing of FIG. 20.

FIG. 24 is a perspective view of another embodiment of the core 56 that may be disposed in the housing 50 of FIG. 20. In the illustrated embodiment of FIG. 24, the core 56 includes an annular body 360. The annular body 360 may be formed of an insulative material, such as a ceramic material. A center portion 362 (e.g., an annular center portion) of the annular body 360 may be machined to form a recessed surface 364 (e.g., a radially recessed annular groove) that includes a first thickness 366 less than a second thickness 368 of ends 370 of the annular body 360. Accordingly, the ends 370 may be configured to contact the inner surface 68 of the housing 50, while a gap (see, e.g., FIG. 26) may be formed between the center portion 362 and the inner surface 68.

The center portion 362 may include a conductive coating 372 (e.g., annular conductive coating) on both an outer surface 374 (e.g., an annular outer surface) and an inner surface 376 (e.g., an annular inner surface) of the annular body 360. The conductive coating 372 may be utilized to form the electric field between the conductive inner surface 68 (e.g., annular inner surface) of the housing 50 and the outer surface 374 of the center portion 362 to monitor the pressure of the fluid flow. In some embodiments, the conductive coating 372 may include a nickel alloy such as Inconel. In other embodiments, the conductive coating 372 may include any suitable conductive material.

As shown in the illustrated embodiment of FIG. 24, one or more annular openings 378 (e.g., 1, 2, 3, 4, 5, 6, 7, 8, 9, 10, or more) may be formed between the conductive coating 372 on the inner surface 374 of the annular body 360 and the conductive coating 372 on the outer surface 376 of the annular body 360. The annular openings 378 may establish an electrical connection between the inner surface 374 and the outer surface 376. Accordingly, the controller 62 (and/or a sensor or another electronic device) may be coupled to the inner surface 374 of the core 56 and detect a capacitance between the outer surface 376 and the inner surface 68 of the housing 50. However, the annular openings 378 may be plugged (e.g., capped and/or filled) with an insulative material 380 (e.g., silicone and/or another insulative material) to block other components from contacting and/or interfering with the electrical connection between the inner surface 374 and the outer surface 376.

Figure 25:
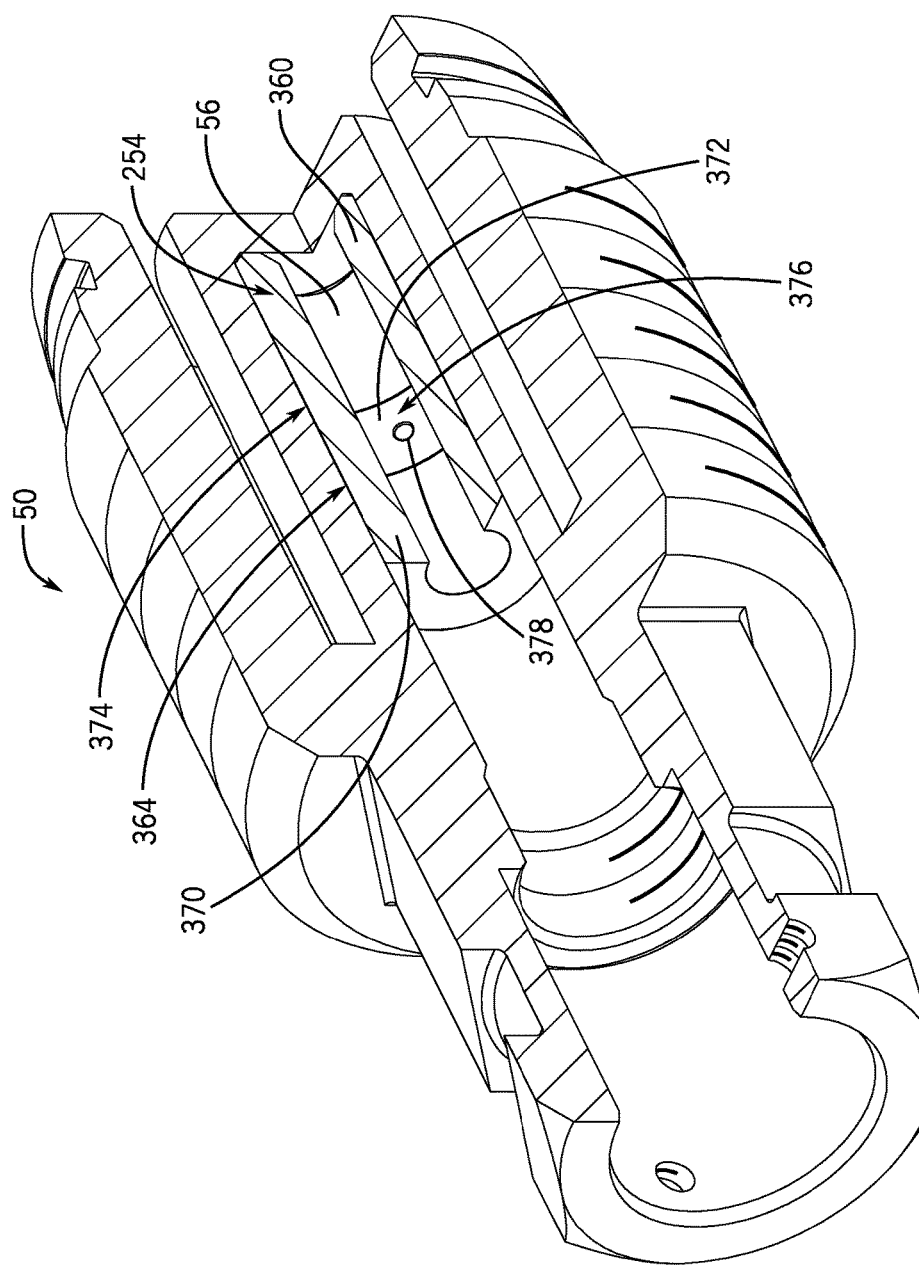
FIG. 25 is a perspective view of an embodiment of the core of FIG. 24 disposed in the housing of FIG. 20.

FIG. 25 is a perspective view of an embodiment of the core 56 of FIG. 24 disposed in the housing 50 of FIG. 20. As discussed above, in some embodiments, the housing 50 may undergo a heat shrink process when the core 56 is disposed in the core housing portion 254. For example, the housing 50 (e.g., the core housing portion 254) may expand when exposed to a heat source (e.g., increasing a temperature of the housing 50), thereby enabling the core 56 to be disposed in the core housing portion 254. When the heat source is removed (e.g., decreasing the temperature of the housing 50), the housing 50 (e.g., the core housing portion 254) may contract, thereby securing the core 56 within the housing 50. Heat shrinking the housing 50 when disposing the core 56 in the core housing portion 254 may reduce an amount of moisture present in the core housing portion 254 (e.g., the heat source evaporates some or all of the moisture in the core housing portion 254). Additionally, during the heat shrinking process, the core housing portion 254 may be purged with an inert gas (e.g., nitrogen (N2), argon (Ar), and/or another suitable non-reactive substance) in order to remove excess air and/or any remaining moisture present in the core housing portion 254. In other embodiments, the inert gas may be directed into the core housing portion 254 to both remove excess air and/or moisture as well as to heat shrink the housing 50. In any case, an accuracy of the capacitance measurements between the outer surface 374 of the annular body 360 and the inner surface 68 of the housing 50 may be enhanced.

For example, FIG. 26 is a cross section of an embodiment of the housing 50 with the core 56 of FIG. 24 disposed in the core housing portion 254. As shown in the illustrated embodiment of FIG. 26, a gap 390 (e.g., an annular gap over a radial distance 391) is formed between the conductive coating 372 on the outer surface 374 of the center portion 362 and the inner surface 68 of the housing 50. Further, the ends 370 of the annular body 360 are contacting the inner surface 68 of the housing 50. In some embodiments, the gap 390 may represent an active area that includes an electrical field between the inner surface 68 of the housing 50 and the core 56. Accordingly, it is desirable to reduce moisture and/or other contaminants within the core housing portion 254 because moisture and/or other contaminants may cause interference to the electric field in the gap 390. Therefore, moisture and/or other contaminants may cause feedback received by the controller 62 from the core 56 to inaccurately reflect an actual pressure of the fluid flow. Therefore, heat shrinking the housing 50 and/or purging the core housing portion 254 with an inert substance upon insertion of the core 56 may enhance the accuracy of the non-invasive capacitive pressure measurement system 12 to measure pressure of the fluid flow.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a hydrocarbon extraction system configured to receive a pressurized fluid, the hydrocarbon extraction system, comprising:
a non-invasive capacitive pressure measurement system configured to measure a pressure of the pressurized fluid, the non-invasive capacitive pressure measurement system, comprising:
a housing;
a core configured to rest within the housing, wherein a gap is formed between the core and the housing; and
an insulative structure disposed within the gap, wherein the insulative structure is configured to support the core within the housing, wherein the insulative structure is configured to maintain the gap between the core and the housing to form a capacitor, and wherein the insulative structure within the gap is configured to compress toward the core and reduce a distance between the core and the housing as the pressure of the pressurized fluid increases.

2. The system of claim 1, comprising a controller electrically coupled to the core and the housing, the controller configured to provide an electrical signal.

3. The system of claim 1, wherein the insulative structure extends along the axis of the core.

4. The system of claim 1, wherein the insulative structure extends circumferentially about the core.

5. The system of claim 1, wherein the core is solid.

6. The system of claim 1, wherein the core is hollow.

7. The system of claim 1, wherein the core includes a conductive coating or layer over a non-conductive material and wherein the conductive coating or layer forms the capacitor with the housing.

8. The system of claim 1, wherein the housing includes a conductive coating or layer over a non-conductive material and wherein the conductive coating or layer forms the capacitor with the core.

9. The system of claim 1, wherein the core includes one or more grooves that receive the insulative structure.

10. The system of claim 1, wherein the housing includes one or more grooves that receive the insulative structure.

11. The system of claim 1, wherein the insulative structure is a foam.

12. The system of claim 1, wherein the core is spherical.

13. The system of claim 1, wherein the core is oval shaped.

14. The system of claim 1, wherein the core is cylindrical.

15. A system, comprising:
   a non-invasive capacitive pressure measurement system configured to measure a pressure of a pressurized fluid, the non-invasive capacitive pressure measurement system, comprising:
      a housing;
      a core configured to rest within the housing, wherein a gap is formed between the core and the housing; and
      an insulative structure disposed within the gap, wherein the insulative structure is configured to support the core within the housing, wherein the insulative structure is configured to maintain the gap between the core and the housing to form a capacitor, and wherein the insulative structure within the gap is configured to compress toward the core and reduce a distance between the core and the housing as the pressure of the pressurized fluid increases.

16. The system of claim 15, comprising a controller electrically coupled to the core and the housing, the controller configured to provide an electrical signal.

17. The system of claim 15, comprising a hydrocarbon extraction system configured to receive the pressurized fluid.

18. The system of claim 15, wherein the non-invasive capacitive pressure measurement system couples to a pressure vessel wall.

19. A method, comprising:
   detecting a pressure of a pressurized fluid with a non-invasive capacitive pressure measurement system, wherein an insulative structure disposed within a gap between a core and a housing of the non-invasive pressure measurement system is configured to compress toward the core and reduce a distance between the core and the housing as the pressure of the pressurized fluid increases; and
   controlling a flow rate of the pressurized fluid based on the detected pressure via a flow control device.

20. The method of claim 19, wherein the detecting the pressure of the pressurized fluid comprises detecting a change in capacitance between the housing and the core of the non-invasive capacitive pressure measurement system.

* * * * *